United States Patent
Thomas et al.

(10) Patent No.: US 12,109,936 B2
(45) Date of Patent: Oct. 8, 2024

(54) LIGHTING DEVICE FOR A MOTOR VEHICLE FOR CREATING A LIGHT ANIMATION

(71) Applicant: Audi AG, Ingolstadt (DE)

(72) Inventors: Werner Thomas, Münchsmünster (DE); Reiner Lendle, Hassmersheim (DE)

(73) Assignee: AUDI AG, Ingolstadt (DE)

( * ) Notice: Subject to any disclaimer, the term of this patent is extended or adjusted under 35 U.S.C. 154(b) by 184 days.

(21) Appl. No.: 17/604,108

(22) PCT Filed: Apr. 15, 2020

(86) PCT No.: PCT/EP2020/060628
§ 371 (c)(1),
(2) Date: Dec. 30, 2021

(87) PCT Pub. No.: WO2020/212449
PCT Pub. Date: Oct. 22, 2020

(65) Prior Publication Data
US 2022/0194293 A1    Jun. 23, 2022

(30) Foreign Application Priority Data

Apr. 17, 2019 (DE) .................. 10 2019 205 641.5

(51) Int. Cl.
*B60Q 1/50*    (2006.01)
*B60Q 1/26*    (2006.01)
(Continued)

(52) U.S. Cl.
CPC ........... *B60Q 1/2607* (2013.01); *B60Q 1/507* (2022.05); *B60Q 1/535* (2022.05); *B60Q 1/543* (2022.05);
(Continued)

(58) Field of Classification Search
CPC ...... B60Q 1/2607; B60Q 1/507; B60Q 1/535; B60Q 1/543; B60Q 2900/40;
(Continued)

(56) References Cited

U.S. PATENT DOCUMENTS 4,556,862 A    12/1985 Meinershagen
6,067,010 A  *  5/2000 Wang ................. B60Q 1/302
                                                  340/478

(Continued)

FOREIGN PATENT DOCUMENTS

DE    19945775 A1    4/2001
DE    20207799 U1    8/2002

(Continued)

OTHER PUBLICATIONS

International Search Report and Written Opinion of the International Searching Authority directed to related International Patent Application No. PCT/EP2020/060628, mailed Jul. 8, 2020, with attached English-language translation; 18 pages.

(Continued)

*Primary Examiner* — Steven Lim
*Assistant Examiner* — Son M Tang
(74) *Attorney, Agent, or Firm* — Sterne, Kessler, Goldstein & Fox P.L.L.C.

(57) ABSTRACT

The application relates to a lighting device for a motor vehicle for creating a light animation. The lighting device comprises a light emission device, the light emission device is subdivided into a plurality of segments. The lighting device further has a control unit, which is designed to separately control each of the plurality of segments of the light emission device. The control unit is also configured to control the plurality of segments in a way that a photometric parameter of the lighting device averaged across all segments for the light animation is within a predefined interval.

10 Claims, 3 Drawing Sheets

(51) Int. Cl.
  *B60Q 1/30* (2006.01)
  *F21S 41/143* (2018.01)
  *F21S 41/155* (2018.01)
  *F21S 41/663* (2018.01)
  *F21Y 115/15* (2016.01)

(52) U.S. Cl.
  CPC ............ *B60Q 1/547* (2022.05); *F21S 41/143* (2018.01); *F21S 41/155* (2018.01); *F21S 41/663* (2018.01); *B60Q 2300/45* (2013.01); *B60Q 2400/10* (2013.01); *B60Q 2900/40* (2022.05); *F21Y 2115/15* (2016.08)

(58) Field of Classification Search
  CPC B60Q 2300/45; B60Q 2400/10; B60Q 1/547; F21S 41/143; F21S 41/155; F21Y 2115/15
  See application file for complete search history.

(56) References Cited

U.S. PATENT DOCUMENTS

| | | | | |
|---|---|---|---|---|
| 6,150,933 | A * | 11/2000 | Matsumoto | B60Q 1/444 340/478 |
| 6,181,243 | B1 * | 1/2001 | Yang | B60Q 1/44 340/471 |
| 6,268,792 | B1 * | 7/2001 | Newton | B60Q 1/444 73/488 |
| 6,286,983 | B1 * | 9/2001 | Macher | B60R 1/1207 362/135 |
| 6,333,688 | B1 * | 12/2001 | Brown | B60Q 1/444 340/478 |
| 7,404,372 | B2 * | 7/2008 | Aasgaard | B60Q 1/52 340/471 |
| 7,866,865 | B2 * | 1/2011 | Wu | G09F 9/33 362/545 |
| 8,325,029 | B2 * | 12/2012 | Brooking | B60Q 1/2611 340/471 |
| 8,358,207 | B2 * | 1/2013 | Lenneman | B60Q 3/78 340/463 |
| 8,398,284 | B1 * | 3/2013 | Dvorzsak | B60Q 1/381 362/249.02 |
| 8,547,219 | B2 * | 10/2013 | Kisiel | B60Q 1/448 340/471 |
| 9,187,031 | B1 * | 11/2015 | Ovenshire | B60Q 1/2696 |
| 9,555,737 | B1 * | 1/2017 | Huang | B60Q 1/2607 |
| 9,896,020 | B2 * | 2/2018 | Dellock | H05B 47/115 |
| 10,240,742 | B2 * | 3/2019 | Kratoska | F21S 43/245 |
| 2006/0133103 | A1 * | 6/2006 | Muhlbaier | B60Q 1/2607 362/545 |
| 2006/0274544 | A1 * | 12/2006 | Inoue | B60Q 1/0041 362/509 |
| 2007/0040664 | A1 * | 2/2007 | Johnson | B60Q 1/444 340/467 |
| 2008/0036582 | A1 * | 2/2008 | Farley | B60Q 1/543 340/468 |
| 2010/0308985 | A1 | 12/2010 | Pusch | |
| 2011/0304455 | A1 * | 12/2011 | Kisiel | B60Q 1/444 340/479 |
| 2012/0206050 | A1 * | 8/2012 | Spero | B60Q 1/1423 315/152 |
| 2017/0242184 | A1 * | 8/2017 | Maraldo | G02B 6/0076 |
| 2018/0007756 | A1 * | 1/2018 | Hong | B60Q 1/44 |
| 2018/0343722 | A1 * | 11/2018 | Matsui | H05B 47/10 |
| 2019/0093847 | A1 * | 3/2019 | Okada | F21S 43/243 |
| 2023/0213777 | A1 * | 7/2023 | Zhang | F21S 41/151 362/459 |

FOREIGN PATENT DOCUMENTS

| | | |
|---|---|---|
| DE | 102005001122 A1 | 7/2006 |
| DE | 102011119558 A1 | 5/2013 |
| DE | 202014101538 U1 | 5/2014 |
| DE | 202013011958 U1 | 2/2015 |
| DE | 202016107063 U1 | 7/2017 |
| EP | 3045351 A2 | 7/2016 |
| FR | 3067307 A1 | 12/2018 |
| GB | 2548946 A | 10/2017 |
| GB | 2554103 A | 3/2018 |
| JP | S5744543 A | 3/1982 |
| WO | WO 2012005412 A1 | 1/2012 |
| WO | WO 2016/001936 A2 | 1/2016 |

OTHER PUBLICATIONS

International Preliminary Report on Patentability directed to related International Patent Application No. PCT/EP2020/060628, completed Jul. 9, 2021, with attached English-language translation; 12 pages.

* cited by examiner

LIGHTING DEVICE FOR A MOTOR VEHICLE FOR CREATING A LIGHT ANIMATION

TECHNICAL FIELD

The application relates to a lighting device for a motor vehicle for creating light animation. In addition, the application also relates to an associated method for creating a light animation for a lighting device of a motor vehicle.

BACKGROUND

Today's light functions in motor vehicles are often still carried out with incandescent lamps or, for some time, in particular in higher-quality motor vehicles, with LED technology. In the case of lights with incandescent lamps, the relatively inexpensive production is an advantage, while in the case of LEDs, relatively large design possibilities, a long service life, and energy efficiency offer advantages.

According to the applicant's current state of knowledge, all previous light sources and point light sources are not able to generate surface light with constant luminance and emission characteristics without additional optics. Furthermore, it is not possible with the currently available lighting systems to create a relatively delicate segmentation within light areas.

A relatively large separation region is often required between the individual light segments. To create a homogeneous light area, a large number of individual LED elements are often arranged behind a diffuse material. This means that the light from these many individual LED elements is scattered in an undefined manner, creating the visual impression of a homogeneously illuminated surface. In terms of measurement technology, however, this is not the case and a very high level of inhomogeneity in the luminance can be detected with the appropriate measurement technology. Due to these aspects, there are restrictions in the design and animation of light functions.

For example, no precisely executed regions with different brightnesses can be displayed within a light area. In addition, the luminance distribution occurring on the light-emitting surface is not constant. This can result, for example, from material tolerances in the diffuser, a non-deterministic distribution of the scattering particles, a tolerance of the LED elements and deviations between the position of the light source and the diffuser with respect to one another. It can thus first be established that it is currently not possible to display a light animation on a projection surface which corresponds to a predefined photometric parameter. The photometric parameter can be, for example, a luminance of the emitting surface. The photometric parameter can also mean a light intensity distribution of a light-emitting device.

Particularly in the region of the tail lights for motor vehicles, it is necessary for each tail light to emit a predefined light intensity. This is mainly due to legal regulations. Nevertheless, there is a desire or need to create different light animations by means of a lighting device of a motor vehicle, for example with a rear light, in spite of this predefined photometric parameter.

It is the object of this invention to provide a lighting device by means of which light animation can be made possible, while still complying with a predefined photometric parameter of the lighting device.

This object is achieved according to the independent claims of this application. Meaningful refinements and alternative embodiments are given in the dependent claims, the description, and in the figures.

BRIEF DESCRIPTION OF DRAWINGS/FIGURES

DETAILED DESCRIPTION

Figure 1:
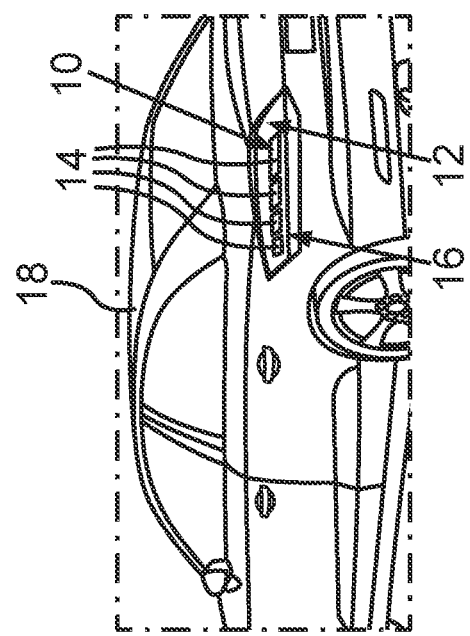
FIG. 1 is an illustration of a motor vehicle with a tail light by way of example.

The application provides a lighting device for a motor vehicle for creating a light animation. The light animation can also or alternatively be output or displayed. The lighting device has a light emission device for creating or displaying the light animation. If the lighting device is designed, for example, as a tail light, the tail light is used to display the motor vehicle and its width to the rear. The light emission device is subdivided into a plurality of segments. The plurality of segments can each be designed as a light source. Each individual segment can be designed as a separate light source. Each segment can thus emit light. The control unit can thus be designed to separately control the plurality of segments or each individual segment. In particular the photometric parameter of each segment is adapted or changed by controlling the control unit. The control unit can thus adapt the respective segments with regard to their luminance or brightness. The control unit can thus let one or more segments light up differently. For example, the light emission device can be divided into a plurality of square surfaces of the same size. The respective segments can be identical or different in terms of their shape and area. Thus, angular, round, oval, triangular, or segments of any shape can be provided. In addition, the respective segments can also be different in size.

The lighting device has a control unit which is designed to separately control each of the plurality of segments of the light emission device. This means in particular that the control unit can control each of the plurality of segments differently. Controlling is understood to mean, in particular, the application of a current flow and/or a voltage to the respective segments. This particularly influences the light intensity or the luminance of the respective segments.

The control unit is designed to control or regulate the plurality of segments differently at a plurality of points in time with respect to a photometric parameter relating to each segment in order to create the light animation. The photometric parameter can contain a value for each segment. For example, the photometric parameter can have a value for the light intensity or for the luminance. This means that a separate value for the photometric parameter can be specified for each individual segment. For example, all segments are identical and have the same luminance of, for example, 5 cd/m$^2$. In this case, each segment has the same value with respect to luminance. The term light animation is linked in particular to the control of the segments of the light emission device, which control varies at different times. This can be viewed as the "segment state" at each point in time. The light animation in particular results in different segment states at different points in time. A corresponding control of the segments with regard to the photometric parameter can be referred to as "light distribution."

The control unit can adjust, control, and/or regulate the luminance or light intensity of the respective segments by regulating the current flow. A corresponding pulse width modulation of the individual segments is possible. Depending on the control, the control unit can apply a different current intensity or voltage to each individual segment of the plurality of segments. In this way, the control unit can set each segment with a different value with respect to the photometric parameter. A plurality of light animations can be displayed by means of the lighting device. The lighting device have one or more light functions. The light function can be, for example, a high beam, a brake light, a flashing light, a tail light, and/or a projection light. The lighting device can thus be designed as a headlight, blinker, and/or rear light.

The control unit is further designed to control the plurality of segments in such a way that the photometric parameter of the lighting device averaged across all segments for the light animation is within a predefined interval. The photometric parameter can in particular be constant. This means that the predefined interval can represent a constant value. "Constant" can mean that a value for the photometric parameter, for example a value for a light intensity or a value for a luminance, does not always exactly correspond to the constant value, but can fluctuate around the constant value within the scope of technical feasibility. For example, a fluctuation of 1, 2, 3, 4, 5, 6, 7, 8, 9 or 10% around the constant value can still mean or represent the constant value. It can therefore be sufficient if the constant value is approximately constant.

Each segment can thus make a contribution to the photometric parameter. The photometric parameter of the lighting device is preferably an effective photometric parameter which is created by a total of all segments of the light emission device. The control unit can be designed to regulate or set a corresponding current intensity of the respective segments in such a way that the value of the photometric parameter, in particular the light intensity or luminance, of the lighting device averaged over all segments is within the predefined interval or is approximately constant. Individual segments can be deactivated or, depending on the control, create a luminance that is below a maximum possible luminance for the segment in question. It is therefore not necessary for each segment to adhere to or fulfill the same photometric parameter or its value. The control unit can dynamically assign the plurality of segments to different groups. This can result in different spatial distributions of the segments. The segments within the group can be controlled equally. For example, the brightness of the segments in a first group can be increased and the segments in a second group can be darkened in order to create a light animation with a predefined light intensity or luminance. The control unit can thus implement different intensity distributions with respect to the photometric parameter for the segments or groups of segments.

A large number or a total of the segments is preferably controlled by the control unit in such a way that the effective photometric parameter or the associated predefined interval is complied with. The control unit can regulate the segments in addition or as an alternative to the control. The control unit can thus be designed to regulate the plurality of segments with regard to their luminance or light intensity in such a way that the photometric parameter of the lighting device, averaged over all segments for each light animation, is within the predefined interval. The luminance of the respective segments can be influenced or regulated on the basis of a corresponding current intensity to which the respective segments are subjected. In particular, the control unit can access sensor data which flow into a regulation of the light intensity. The sensor data can be, for example, temperature data or running time data of the segments. With the aid of the averaging, in particular the effective photometric parameter for the lighting device can be determined or set.

The term photometric parameter can have different meanings. The photometric parameter can mean, for example, a light intensity. A light intensity is, in particular, a luminous flux that is emitted at a specific solid angle. The light intensity can thus be expressed as luminous flux per solid angle. The solid angle is preferably not a planar two-dimensional solid angle, but a three-dimensional solid angle that is specified in steradians. The SI unit for the light intensity is candela (cd). In particular, the photometric parameter can relate exclusively to the light intensity. Statutory regulations or ordinances relating to the lighting of motor vehicles, for example, stipulate values with respect to the light intensity of tail lights for motor vehicles.

For example, a legal regulation in the Official Journal of the European Union L285 of Sep. 30, 2014 mentions a minimum light intensity for tail lights of four candelas. Since the legal requirements or ordinances relate to the light intensity, the photometric parameter of the tail light can also relate to the light intensity. The same can apply to other lighting devices.

However, the term photometric parameter can alternatively or additionally mean a luminance. Luminance can be interpreted as the luminous flux that is emitted from a surface. Thus, the unit of luminance is candela per square meter ($cd/m^2$), while the unit of light intensity is candela (cd). The luminance is therefore related to a surface. With regard to this surface, there are different starting points or possible interpretations. In the scope of this application, in connection with the luminance, every surface is always used which is illuminated or emits light. These are in particular the respective segments of the light emission device. In the scope of this application, the focus is not on an "apparent" size of the surface or a surface seen, which is dependent on an external reference point. The luminance in the scope of this application is therefore the luminous flux that is emitted from the illuminated surface (segments of the light emission device). Although the legal regulations or ordinances relate to the light intensity, the lighting or emission of light from the lighting device is technically realized with the aid of different luminance levels of the respective segments. It can therefore occasionally make sense to adjust the photometric parameter to the luminance of the respective segments or of the light emission device. In this case, however, that luminance of the respective segments is preferably selected or set so that the predefined light intensity of the lighting device or tail light corresponds to the legal regulations.

For the same reason, the photometric parameter can also be based on the luminous flux or on an illuminance. The illuminance can be understood as the luminous flux that strikes an illuminated surface. This surface is in particular a projection surface which represents the light animation. The more light or luminous flux that is emitted from the light emission device to the projection surface (cover plate), the higher the illuminance. In the scope of this application, the term photometric parameter preferably relates to the light intensity and/or to the luminance.

The control unit can separately control or regulate the luminance of each individual segment, so that the photometric parameter of the lighting device, averaged over all segments, is within a predefined interval. The predefined interval can, for example, have a lower value and an upper value. In the case of the tail light as a lighting device, the lower value can be 4 candela, for example. The upper value can be, for example, 17 candela. It is therefore not absolutely necessary for the light intensity of the tail light to assume an exactly predefined value, but it is possible for the photometric parameter to be within the predefined interval. This predefined interval is particularly important in the context of authorizations for motor vehicles. The invention is thus based on the object of displaying one or more different light animations or tail light states and at the same time meeting the predefined authorization requirements (predefined photometric parameters within the interval). Since the photometric parameter must lie within the interval, one often speaks of a "corridor authorization".

The legal requirements or legal provisions can contain further situation-related regulations relating to the photometric parameters. For example, a predefined interval can apply to a raised tail light of a truck, which interval differs from the predefined interval of the tail light of a motor vehicle. This fact can be taken into account by the control unit when controlling the respective segments. In this way, a tail light for a motor vehicle can be provided which not only meets the legal requirements, but also allows a plurality of light functions to be represented. This can be used to provide information for pedestrians, for example. This is particularly relevant for fully autonomous motor vehicles. In this way, for example, a fully autonomous motor vehicle can signal to a pedestrian that it will, for example, stop in good time and that the pedestrian can cross the lane. Information can also be provided for drivers of motor vehicles behind the vehicle. For example, if a rear motor vehicle drives too close to the motor vehicle having the lighting device according to the invention in the form of the tail light, information can be discreetly transmitted to the rearward driver stating that the distance between the two motor vehicles is too small. Information can be provided accordingly, depending on the corresponding light function. This makes it possible to use the lighting device to generate new optical effects and to provide vehicle lighting with a high-quality appearance.

Another additional or alternative embodiment provides a lighting device with a cover plate, which can be configured as a projection surface of the lighting device for creating, outputting, or displaying the light animation. The cover plate is usually arranged in the direction of the light beams which are emitted by the light emission device. The cover plate is preferably designed to be transparent. The cover plate can additionally or alternatively be designed as a shielding element for partially shielding the light emission device from its surroundings. In this case, the cover plate not only shields the light emission device from environmental influences (for example moisture and dirt) but can also be configured as an optical element. For example, a direction of the light beams emitted by the light emission device can be changed with the aid of the cover plate. This is achieved, for example, in that the cover plate has a corresponding refractive index. This can allow additional degrees of freedom with regard to the arrangement and geometry of the respective segments of the light emission device. For example, the segments can be arranged at an angle and initially emit their respective light beams at an otherwise unusual angle. With the aid of the cover plate, these obliquely emitted light beams can be modified in terms of their direction of propagation in such a way that the emitted light of the lighting device is clearly visible again to other road users. The cover plate can thus focus a fanned-out light beam, for example. The light animation can be displayed or presented on the cover plate. However, the light animation can also be displayed without a cover plate. Communication with other road users can thus be made possible by means of the lighting device, while the legal requirements are nevertheless complied with.

Another additional or alternative embodiment provides a lighting device, wherein the light emission device has an OLED with a plurality of segments, or the light emission device has a plurality of LED elements as the plurality of segments with an optical element. A homogeneous surface light source can be created with the aid of the optical element. Inhomogeneous light can thus be transformed into homogeneous light by means of the optical element, so that the impression of a homogeneous surface light source is created. The term OLED (Organic Light Emitting Diode) is mostly used as an abbreviation for the term organic light-emitting diode. The OLED is, in particular, a luminous thin-film component made from organic semiconducting materials. LED elements are, in particular, inorganic light-emitting diodes. OLED light sources have already evolved to such an extent that OLED light sources can be used in the field of vehicle technology. OLEDs are particularly suitable for this invention, since homogeneous surface light sources can be provided with the aid of OLEDs. A light emission device which has one or more OLED elements is able to create homogeneous surface light.

Such a homogeneous surface light can be created with LED elements in combination with the optical element. In this way, a non-homogeneous surface light from the plurality of LED elements can be converted into a homogeneous surface light with the aid of the optical element. In particularly advantageous embodiments, the OLED is designed as a Lambertian emitter. In this case, the luminance and the radiation behavior of each of the plurality of segments of the OLED are identical. The radiation behavior relates in particular to an angular distribution of the emitted light. Both OLEDs and conventional LED elements can be used to provide a homogeneous surface light source. With the aid of a homogeneous surface light source, the light animation can be created and displayed more easily.

The term light function means, in particular, a corresponding light application on a motor vehicle. For example, the tail light, a brake light, a high beam, or a low beam represent different light functions. With regard to the tail light, a light animation consisting of a plurality of light distributions or segment states is preferably used. The plurality of segment states at different points in time result in the light animation. By means of light animation, a plurality of light distributions can be addressed in a predefined time interval. A plurality of light animations can be created. The light animation can be created or displayed on a projection surface, for example the cover plate. The cover plate can be designed as a transparent shielding element. In this case, the light animation or the light function is directly visible and, in particular, no light animation is projected onto the cover plate. The time interval can contain a plurality of points in time. A different light distribution can be provided at each of these points in time. The light distributions can be dependent not only on the time, but also on the location, namely a corresponding point on the projection surface. In particular, the light animation can be displayed directly on a surface of the respective segments instead of on the projection surface. In this case, the surface of the respective segments corresponds to the projection surface.

Another additional or alternative embodiment provides that, in a predefined standard operating situation, the plurality of segments each have the same luminance and the same emission characteristic within a predefined tolerance level. This applies in particular to homogeneous surface light sources. The emission characteristic describes in particular how much light, i.e. how much luminous flux, is emitted through a predefined surface segment or a predefined solid angle. Previous homogeneous surface light sources are in particular already considered homogeneous surface light sources if the luminance deviates from the associated mean value by at most 10%. This embodiment provides in particular that the predefined tolerance level is a maximum of 2%. This reduced tolerance level can be achieved by means of the separate control of the plurality of segments. This means that the luminance fluctuates by a maximum of 2% around the mean value of the luminance of the light emission device. This criterion preferably applies to each individual segment of the light emission device. This means that even more precise light animations can be created or displayed. The surface light sources previously considered to be homogeneous may appear homogeneous to the human eye, but it can be proven by measurement that fluctuations nevertheless occur in this case. These fluctuations can be further reduced with the aid of the lighting device described herein. This can help provide a more standardized tail light for motor vehicles.

Another additional or alternative embodiment provides that the light emission device is designed as a Lambertian emitter. A Lambertian emitter is in particular a light source which emits light according to Lambert's law. In a light emission device that follows Lambert's law, the emitted light intensity is dependent on the direction of the emitted light beams, but the resulting luminance is direction-independent, i.e. in particular, angle-independent. A light emission device, which can be viewed as a Lambertian emitter, facilitates the control of the respective segments and thus the generation, output, or display of the light animation. The control unit can control all segments equally in order to implement a Lambertian emitter as a light emission device. The advantages mentioned in the preceding embodiment apply mutatis mutandis to this embodiment.

Another additional or alternative embodiment provides that the lighting device has a plurality of light emission devices, the control unit being designed to create the light animation of the plurality of light emission devices in normal operation symmetrically with respect to a predefined plane of symmetry. In particular, an even number of light emission devices can be provided. This even number of light emission devices can be arranged at the rear of a motor vehicle, for example. The predefined plane of symmetry is in particular parallel to the provided projection surface. A part of the even-numbered light emission devices may be arranged on one side of the motor vehicle and the other part of the even-numbered light emission devices may be arranged on the opposite side of the motor vehicle. The predefined plane of symmetry can in particular be perpendicular to a predefined main emission direction of the light emission devices. In the case of the motor vehicle, a first light emission device can be arranged on a first side and a second light emission device on a second side of the motor vehicle. In this case, the rear of the vehicle is chosen as the reference point. In this embodiment, the light animations created and displayed by the first and the second light emission device are mutually symmetrical with respect to the plane of symmetry. Thus, another driver in the rear of the motor vehicle can perceive the light animations as symmetrical.

Another additional or alternative embodiment provides that the control unit is designed to determine a part of the plurality of segments that forms a closed curve. It can be provided that the control unit determines part of the plurality of segments, the emitted light of which forms a closed curve on the cover plate. The closed curve can be, for example, a circle, a rectangle, or a triangle. The shapes mentioned as a closed curve can also be arched or curved due to a curvature of the cover plate. This closed curve can be referred to as a circumscribing surface, by means of which a frame is predefined for the light animation. This can help to better perceive the light animation. It is provided in particular that the part of the plurality of segments, the emitted light of which forms the closed curve, always creates a constant luminance. The constant luminance of the part of the plurality of segments is preferably constant over time. In this way, a static frame can be created within which the light animation can be output, created, or displayed. The luminance of the respective segments is modified and controlled in particular in such a way that a continuous closed curve or rectangle with constant brightness is created on the cover plate or the light emission device. The curve or the rectangle can also be curved due to a predefined curvature of the cover plate.

Another additional or alternative embodiment provides that the control unit is designed to keep constant a corresponding first luminance of those segments that are assigned to the closed curve, and to vary a second corresponding luminance of those segments which are assigned to an inner region of the closed curve for different light functions. Instead of the corresponding luminance of the segments, the corresponding light intensity of the segments can be kept constant or varied. In particular, the first or second luminance can relate to the cover plate. In this case, it is therefore not a matter of which luminance or light intensity each segment has, but rather the emitted light intensity of the light animation. This embodiment can thus provide that the first or second luminance relates to the respective segments or to the cover plate, depending on the application. For example, the segments assigned to the closed curve have a higher luminance than the segments assigned to the inner region of the closed curve. The advantages and examples mentioned in the previous embodiment apply mutatis mutandis to this embodiment.

Another additional or alternative embodiment provides that the control unit is designed to keep constant a corresponding luminance of individual or a plurality of segments that are assigned to the closed curve for a predefined time step. In this case, it is possible that only part of the closed curve is illuminated. In a further time step, other segments can be selected by the control unit which should have a constant luminance for the predefined time step.

Another additional or alternative embodiment provides that the control unit is designed to use a control function, in particular a random function created by means of a random generator, to control the respective segments, wherein the control function describes which segment should have which luminance at which point in time. The control function can also refer to the light intensity instead of the luminance. The different control functions are often referred to as characteristic curves. These characteristic curves can be linear, quadratic, sinusoidal, a polynomial or have some other mathematical function as a basis. A linear combination of these mentioned mathematical functions for the control function is possible. In particular, a different control function can be provided for each individual segment. A subset of the segments can be controlled or regulated with the same control function.

For example, two segments can have different dimming ramps. A dimming ramp is in particular a linear characteristic curve. In this case, the dimming ramps can be designed to run in opposite directions, so that the same light intensity always results in relation to the entire light emission device. In the simple case of only two segments, the first segment would be brightened (e.g. increasing the current intensity), while the second segment would be darkened (e.g. reducing the current intensity) by the same amount. In total, the emitted light intensity of these two segments would remain constant. This principle for two individual segments can be extended analogously to a light emission device with a large number of segments. The associated control functions can be repeated at any time or run as an endless loop.

It is also possible that more than two segments and a plurality of levels of brightness are used. The number and position of the respective segments in the light emission device can in particular be freely selected. Thus, lighting devices with several 100 or even several 1000 segments can be used. In particular, the segments can be controlled with different brightnesses depending on their size, position within the light emission device, and/or the corresponding segment shape, in order to continue to achieve the predefined constant light intensity. The respective characteristic curves or control functions of the individual segments can have the same slope, a different slope, a uniform or variable slope. Likewise, the slope of the characteristic curve of a part of the plurality of segments can be zero.

With the aid of the random generator (deterministic "random behavior"/pseudo-random), random functions can be created as control functions. These random functions in particular meet the boundary condition that the predefined photometric parameter is complied with. As a result, further high-quality light animations can be displayed by means of the lighting device. Depending on the desired light animation, all homologation-relevant parameters of the light emission device can be kept constant and at the same time a dynamic light signature can be displayed. The light signature can be understood as the light animation. The light animation can also be used to display (simple) symbols. The photometric parameters preferably remain constant in the form of authorization. This applies in particular to analog static light signatures. For example, tail light signatures can be used in the vehicle rear lighting. This means that dynamic light animations can be implemented that are easier to recognize and attract more attention without causing additional glare like conventional lights.

Another additional or alternative embodiment provides that the control function is determined by the control unit in such a way that a light focal point is shifted when the corresponding light animation is displayed. The light focal point can be defined in the same way as a gravitational center of gravity. In particular, the corresponding brightness applied to the illuminated segment influences the position of the light focal point. The position of the light focal point can in particular depend on the number and distribution of the illuminated segments, the corresponding degree of brightness of the illuminated segments, and on deactivated, i.e. dark, segments. Corresponding averaging of the luminance over all segments of the light emission device, taking into account a position of the respective segments or assignable illuminated surface segments on the cover plate, results in particular in the light focal point. The light focal point can thus be understood as an average weighted with the brightness or luminance of the respective positions of the segments or illuminated surface segments. All segments of the light emission device or only a part of the totality of the segments can be taken into account in order to determine the light focal point. In the case of a shifted light focal point, a plurality of light distributions preferably has a different light focal point.

By means of a weighting factor, a relative luminance of each segment can be taken into account for the determination of the light focal point. In the case of a fully illuminated segment, a weighting factor for the corresponding averaging would be 1; in the case of a deactivated segment, the weighting factor would be 0. Since each light distribution can have its own light focal point, this light focal point can be shifted using different light distributions with a different light focal point. For example, a light focal point running from the outside to the inside can signal a dangerous situation to another road user.

Another additional or alternative embodiment provides that the control unit is designed to control the respective segments depending on a predefined luminance of the cover plate for the light animation. This embodiment accordingly provides that the control unit is based on a predefined luminance of the cover plate. The control unit can, in particular, implement a predefined illuminance distribution on the cover plate. This is achieved, for example, in that the control unit controls the respective segments in such a way that a desired or predefined illuminance is achieved on the cover plate. In this embodiment, the focus is on the luminance of the cover plate and not on the luminance of the respective segments. In this case, the photometric parameter is related to the luminance of the cover plate. In connection with the examples and advantages mentioned in the previous embodiments apply mutatis mutandis to this embodiment.

Another additional or alternative embodiment provides that the control unit is designed to control predefined segments with a predefined luminance for a predefined time interval, wherein the luminance is kept constant during the predefined time interval. The predefined segments can form a geometric figure. This can be a geometric figure on the surface of the light emission device or on the cover plate. For example, the geometric figure can be a letter, a character, or a symbol. Predefined information can be assigned to each geometric figure for subsequent traffic. Acceleration, braking, or turning can be displayed or communicated.

Another additional or alternative embodiment provides that the control unit is designed to change a photometric parameter of each individual segment by means of a change in a corresponding current flow and/or a change in the corresponding voltage applied to the individual segment, in particular by means of PWM dimming of a large number of segments. In this embodiment, the photometric parameters of the individual segments are changed. The photometric parameter is understood to mean in particular, as described above, a luminance and/or a light intensity. In this embodiment, the individual segments of the light emission device or the OLED can be controlled depending on the desired luminance. The corresponding luminance of each individual segment can be adapted by means of a corresponding current intensity for the individual segment. A simple control operation can thus be achieved by means of the control unit since in the case of the OLED the change in the luminance is relatively linear to the change in the current intensity. In simplified terms, it can be assumed that there is a linear relationship between the luminance of the segment and the current intensity applied to the segment.

Likewise, the luminance or brightness per segment can be set by changing the voltage applied to each segment. In particular, the applied current intensity can be modified in order to set, influence, or regulate the luminance of each segment. In this embodiment, pulse width modulation can also advantageously be used. In this case, with regard to the current intensity or the voltage, a corresponding duty cycle can be defined for the current intensity or voltage applied. A square-wave signal is preferably used for pulse width modulation. This square-wave signal has in particular two values, namely state 0 for switched off and state 1 for switched on. Each time span for state 0 or state 1 defines the duty cycle. With the aid of pulse width modulation, the luminance can also be set individually for each individual segment. The control unit can thus control a large number of segments of the light emission device in terms of their luminance with the aid of pulse width modulation or pulse width dimming.

Another additional or alternative embodiment provides that the lighting device has a sensor for measuring a temperature or a running time of the light emission device. The control unit is designed to additionally control or regulate the respective segments of the light emission device depending on the measured temperature of the light emission device and/or the running time of the light emission device. The control unit can regulate the photometric parameters, in particular the light intensity, luminance, or brightness, of the lighting device based on the sensor data, in particular the measured temperature and/or running time. The temperature of the light emission device can in particular be an average temperature of the light emission device. In particular, the temperature of each individual segment can be detected. A large number of temperature values can be obtained from this, each of which shows the temperature of the associated segment. An average temperature for the entire light emission device can be determined from this large number of temperature values.

The running time of the light emission device can in particular describe how many time units the light emission device has been in uninterrupted operation or how many time units have passed since its production. These time units are in particular hours, days, or years. The running time can describe how many time units the light emission device was in operation in a predefined period of time. The sensor for measuring the temperature can for example take place by means of an NTC resistor or NTC thermistor. Using this type of temperature sensor, an associated temperature can be deduced from a measured current flow. The control unit can thus take into account temperature effects and aging effects when controlling the respective segments. It is thus possible to provide a lighting device that can meet the legal requirements over its service life. Thus, a lighting device with the ability to display light animations can be created which achieves a high degree of quality.

Another additional or alternative embodiment provides a motor vehicle with a lighting device according to any of the preceding embodiments. The light animations that can be achieved with the lighting device can be used for communication with other road users. A higher level of attention can be generated without causing harmful dazzling of other road users. The advantages and examples mentioned in the preceding embodiments apply mutatis mutandis to the motor vehicle having the lighting device. The lighting device can have a plurality of tail lights or a plurality of other vehicle lights.

The control unit can have a processor means which is configured to carry out the method or one of the preceding embodiments. The control unit can be part of the motor vehicle or the motor vehicle can contain the control unit. For this purpose, the processor means can have at least one microprocessor and/or at least one microcontroller and/or at least one FPGA (Field Programmable Gate Array) and/or at least one DSP (Digital Signal Processor). Furthermore, the processor means can have a program code which is configured to carry out the embodiment of the method according to the invention when executed by the processor means. The program code can be stored in a data memory of the processor means.

The invention also relates to a method for creating a light animation for a lighting device. The method can additionally or alternatively be suitable for outputting or displaying the light animation. The tail light has a light emission device which is subdivided into a plurality of segments. This method is characterized by a separate control of the plurality of segments of the light emission device, the control being carried out in such a way that a photometric parameter of the light emission device is within a predefined interval. The plurality of segments is controlled differently at a plurality of points in time with respect to the photometric parameter relating to each segment. In particular, the light animation is output or created in this way. The examples and advantages shown in the previous embodiments apply mutatis mutandis to the method shown and vice versa. Functional features of the method can be viewed as corresponding device features. Device features can also be viewed as corresponding method features.

The invention will now be explained in more detail with reference to the accompanying figures. It should be noted that the examples shown in the figures represent particularly preferred embodiments, which, however, are not to be understood as a restriction for the invention. The exemplary embodiments serve in particular to show how the invention can be used or implemented by way of example.

The invention includes refinements of the method according to the invention, which have features such as those that were previously described in connection with the refinements of the motor vehicle according to the invention. For this reason, the corresponding refinements of the method according to the invention are not described again herein.

The motor vehicle according to the invention is preferably designed as a car, in particular as a passenger car or truck or as a passenger bus or motorcycle.

The invention also comprises the combinations of the features of the described embodiments.

The embodiments explained below are preferred embodiments of the invention. In the embodiments, the described components of the embodiments each represent individual features of the invention which are to be considered to be independent of one another and which each further develop the invention independently of one another. Therefore, the disclosure shall also comprise other combinations of the features of the embodiments than the ones presented. Furthermore, the described embodiments may also be supplemented by further features of the invention as already described.

In the drawings, the same reference signs refer to functionally identical elements.

FIG. 1 shows, by way of example, a motor vehicle 18 which has a tail light 10. In the figures, the lighting device 10 is designed as a tail light 10. The tail light 10 has a transparent cover plate 12 and a light emission device 24. The tail light 10 is used in particular for a tail light as a light function. The light emission device 24 can have an OLED 14 or one or more LEDs 16. In the example of FIG. 1, the light emission device 24 has both a plurality of LED elements 16 and a plurality of OLED elements 14. The OLED 14 is in particular a homogeneous surface light source and, in particularly advantageous embodiments, can be designed as a Lambertian emitter. In this case, the luminance and the radiation behavior (angular distribution) are identical for each surface element (segment of the OLED 14). The light emission device 24 preferably emits red light 22.

Figure 2:
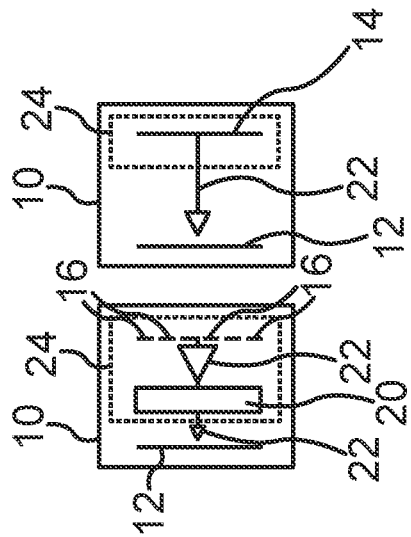
FIG. 2 shows two tail lights as a lighting device, each with a different light emission device.

FIG. 2 shows by way of example how a surface light source can be created with the aid of a plurality of LED elements 16. On the right in FIG. 2, the light emission device 24 only has the OLED 14. Their emitted light 22 is preferably homogeneous. The light 22 of the OLED 14 strikes the cover plate 12 in the further course. The cover plate 12 can have a refractive index different from one in order to modify the light 22 or the light beams 22 accordingly with regard to their direction of propagation. Thus, the cover plate 12 can be designed as a lens. In particular, the light 22 has a wavelength which is perceived as red light 22. In the left example of FIG. 2, the light emission device 24 has two elements. The plurality of LED elements 16 form in this case a first unit of the light emission device 24. A second unit of the light emission device 24 is represented by an optical element 20. This optical element 20 is used in particular to create a homogeneous surface light source from the emitted light 22 of the plurality of LED elements 16.

The light 22 emitted by the optical element 20 preferably corresponds to that light which is comparable to the OLED 14 with regard to the emission characteristics and luminance. The optical element 20 is arranged in the region of the LED elements 16 in FIG. 1. Since both the cover plate 12 and the optical element 20 are each transparent, the optical element 20 cannot be recognized in FIG. 1. In the case of FIGS. 1 and 2, both light emission devices 24 are shown in a motor vehicle rear light with the cover plate 12. The motor vehicle rear light corresponds to the tail light. If the light emission device 24 is designed as an OLED 14, this allows for very fine separations between the individual segments.

The term OLED and the term OLED light source can be understood as synonyms in the scope of this application. The OLED 14 thus represents a special form of a light source. In the example in FIG. 1, four different OLEDs 14 can be seen. In this case, the OLED 14 arranged furthest to the right is designed to be the largest. This right OLED 14 is approximately 15 centimeters long and approximately 40 millimeters high and has three segments Si. However, OLEDs with significantly more segments Si can also be provided. For example, it is planned to use OLEDs 14 which have a light area of approximately 25 square centimeters and are subdivided into approximately 1000 Si segments. The index i identifies a corresponding number of each segment.

Figure 3:
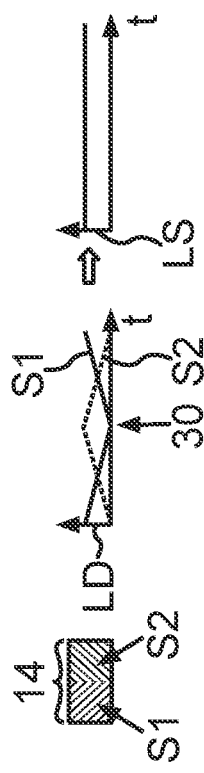
FIG. 3 shows two segments of an OLED light source with a corresponding control function by way of example.

In FIG. 3, a simple OLED 14 is shown by way of example, which has only two segments Si. The OLED 14 has a first segment S1 and a second segment S2. For the sake of simplicity, it is assumed that the OLED 14 does not have any further segments Si. These two segments S1 and S2 have the same size and shape in this simple example. However, these two segments S1 and S2 can assume different levels of brightness, i.e. different luminance levels LD. These different luminances LD can be set with the aid of a control unit 40. In the example of FIG. 3, segment S1 is somewhat darkened compared to segment S2. This situation represents a state at a predefined point in time. The middle image in FIG. 3 shows, by way of example, two possible control functions 30 or characteristic curves 30 for the first and second segments S1 and S2. This control function 30 contains a time t on an x-axis and the luminance LD on a y-axis. As can be seen clearly in FIG. 3, the respective characteristic curves are designed to be linear. Instead of linear characteristic curves 30 or control functions 30, more complex functions such as polynomials or sine functions can be used. As the control function 30 of FIG. 3 shows schematically, the brighter segment Sh is dimmed at the same time and the darker segment Sd is brightened up with an opposing characteristic curve at the same time, so that a resulting light intensity LS of the entire light emission device 24 remains constant. In the simplified illustration of FIG. 3, the light emission device 24 consists only of the first segment S1 and the second segment S2. The result of the opposing characteristic curves 30 of the control function 30 shown in FIG. 3 is the course of the light intensity LS shown on the right in FIG. 3. The course of the light intensity LS is constant and is not subject to any fluctuation.

In the case of different area ratios of the respective segments Si, appropriately adapted control functions 30 can be used to compensate. In this way, a constant light intensity LS of the light emission device 24 can furthermore be achieved. The control functions 30 can be repeated at any time or run as an endless loop.

Figure 4:
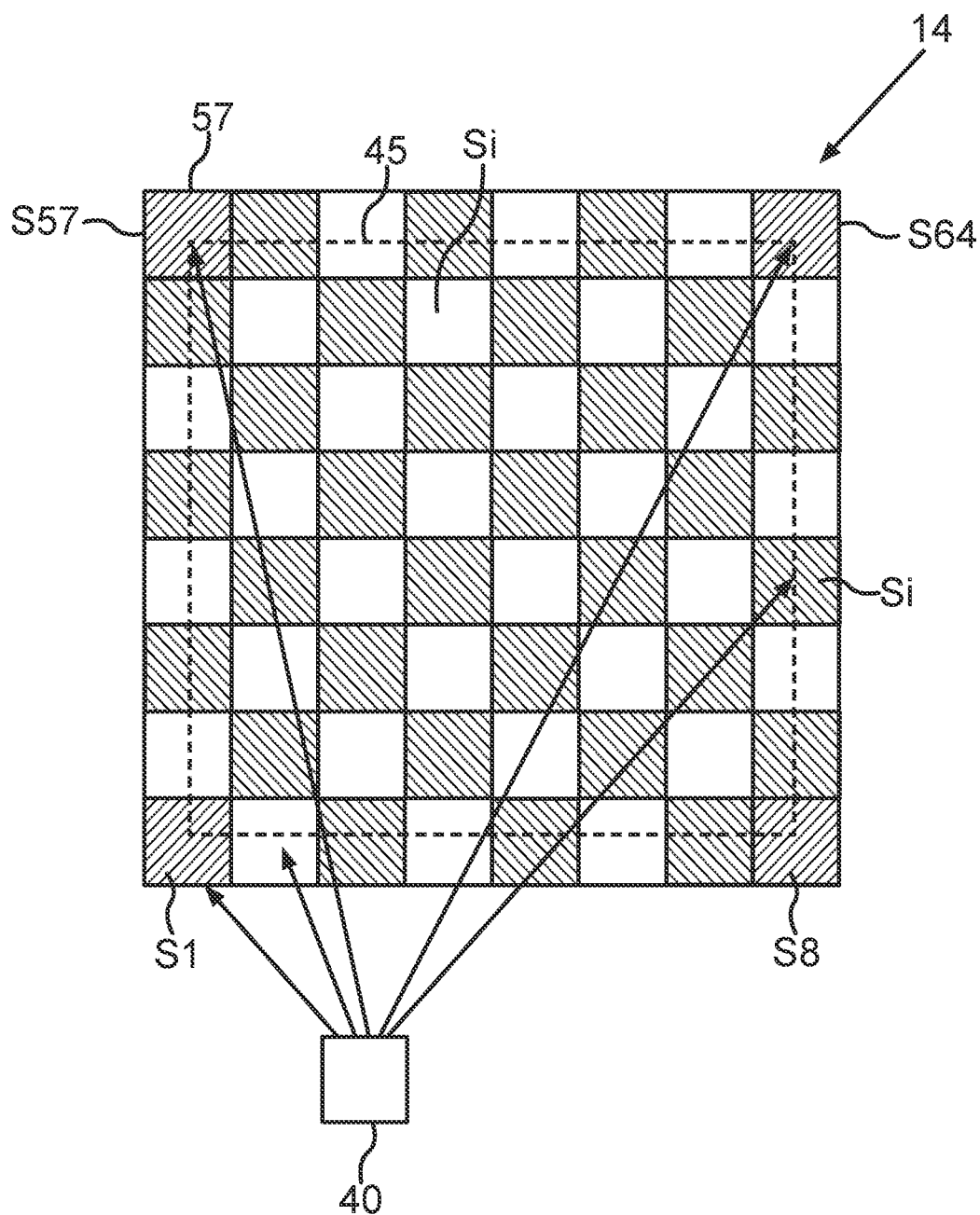
FIG. 4 shows a multi-segment system with segments of constant luminance by way of example.

In FIG. 4, a further embodiment is shown, which has more than two segments and uses a plurality of levels of brightness. In the case of FIG. 4, the control unit controls 64 segments Si. The control unit 40 can control both the first segment S1 and the 64th segment S64 and all segments in between individually and separately. In the example in FIG. 4, the segments S1, S8, S57, and S64 have the same luminance LD. In this case, it is assumed that the corresponding luminance is 100 percent of each segment and that the corresponding segments of the four segments are identical. These four segments S1, S8, S57 and S64 specify a frame 45 in FIG. 4 within which the light distributions, segment states, or the light animation can be created. Contrary to the illustration in FIG. 4, the number and position of the individual segments Si can be as desired. Depending on their size, position, and/or the shape of the respective segments Si, the respective segments Si are subjected to different luminances LD so that the predefined photometric parameters LS, LD are maintained. This is in particular the legally prescribed light intensity LS for the tail light 10 of the motor vehicle 18.

In the example in FIG. 4, the four edge segments S1, S8, S57, and S64 accordingly light up with the same maximum luminance LD. The remaining segments Si of this OLED 14 are set in their luminance LD by the control unit 40 in such a way that the predefined light intensity LS is maintained. This can be done, for example, with the aid of corresponding linear control functions 30, which can be referred to as dimming ramps. To create further light animations or light distributions, a random generator can be used, which creates corresponding random functions for controlling the plurality of segments. However, the random function created in this way fulfills the boundary condition that the light intensity LS emitted by the OLED 14 or the light intensity LS emitted by the tail light 10 a predefined value or its light intensity value is within a predefined interval.

Each segment shown in FIG. 4, with the exception of the four edge segments S1, S8, S57 and S64, can be controlled by the control unit 40 with its own dimming ramp or its own control function. This is implemented, for example, with the aid of a changed current flow or a changed voltage that is applied to each segment Si. The luminance of the segments Si or the four edge segments can be temporarily or permanently between 0% and 100% of the maximum luminance LD of the segments. The current flow or the applied voltage can be set with the aid of pulse width modulation or pulse width dimming. Instead of the four edge segments shown, an edge curve can be predefined which forms the frame 45. In particular, those segments Si of the OLED 14 are selected which result in a closed curve on the cover plate 12. A dashed course shown in FIG. 4 indicates a possible edge region which can represent the frame 45 on the cover plate 12. The segments Si, which belong to this frame 45, can be illuminated like the segments S1, S57 and S64 with the same predefined luminance LD. In this case, it is assumed in a simplified manner that the frame 45 shown in FIG. 4 or the corner points are also projected onto the cover plate 12 without falsification. The control unit 40 can in particular take into account an imaging rule which assigns the light 22 emitted by a segment Si to a surface segment on the cover plate 12.

In a further embodiment, the edge segments S1, S8, S57, and S64 can vary their luminance LD over time. The edge segments S1, S8, S57, and S64 can accordingly light up to different degrees at different points in time. A kind of "dynamic frame" can be output within which a further light animation is created or displayed. Thus, in order to represent the frame 45, it is not necessary for the edge segments S1, S8, S57, and S67 to constantly light up. These edge segments S1, S8, S57 and S67 can be variable with regard to their luminance LD or can be acted upon accordingly by the control unit 40 with different current flows at different points in time t, so that luminances LD that are variable over time result accordingly.

Figure 5:
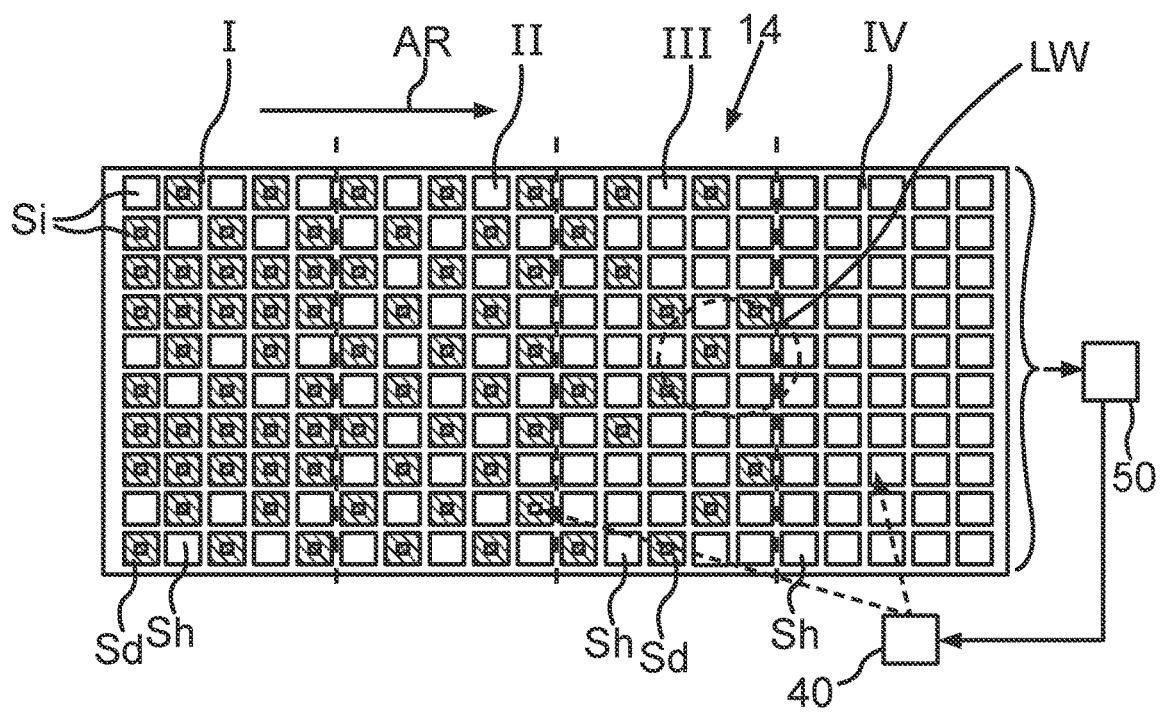
FIG. 5 shows a light animation with a vertical light focal point shifted to the right by way of example.
Figure 6:
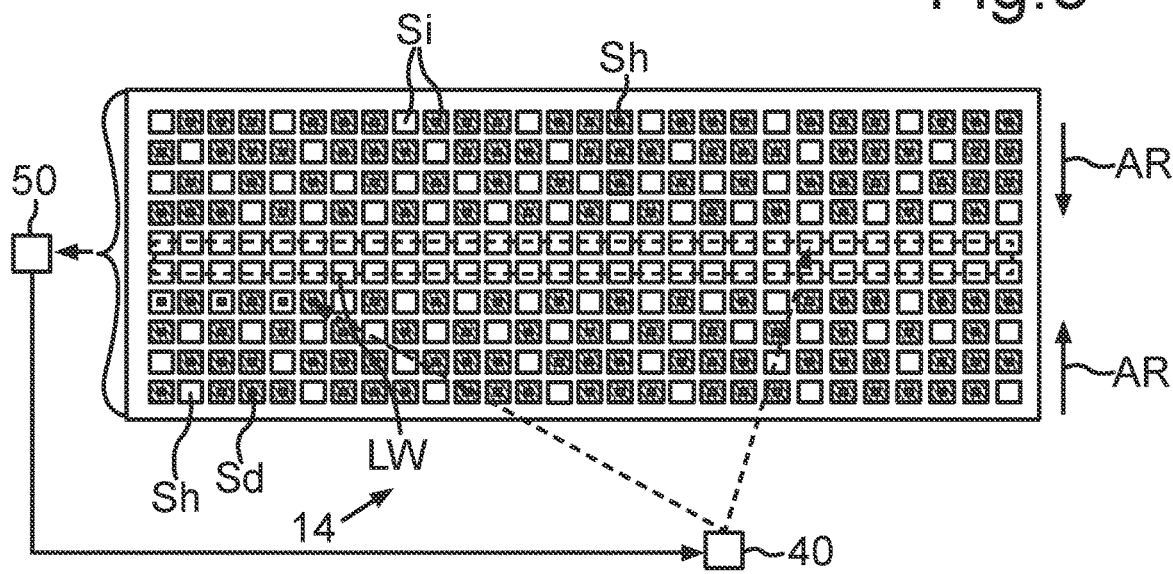
FIG. 6 shows a light animation with a horizontal light focal point.

FIG. 5 shows a light animation in which a light focal point LW is shifted to the right by way of example. The light focal point LW does not have to be an individual point or an individual segment Si. As shown in FIG. 6, the light focal point LW can have a spatial extent. In FIG. 5, the segments are each designated by Sh or Sd. Sh means that it is a bright segment and Sd means that it is a dark segment. Of course, further gradations with respect to the luminance LD are possible between Sh and Sd. For the sake of simplicity, however, such intermediate stages are neglected.

The OLED 14 shown in FIG. 5 is divided into four regions. In the region I, the number of dark segments is greatest compared to the other regions. Correspondingly, the number of bright segments Sh in the first region I is lowest compared to the other segments Si. It can be clearly seen along an animation direction AR that the number of bright segments Sh increases per region. In the second region II of the OLED 14, the relative number of bright segments Sh has already increased compared to the first region I. In the fourth region IV, only bright segments Sh can be seen. This has the effect that the light focal point LW is not arranged centrally on the surface of the OLED 14 or the cover plate 12, but rather is shifted somewhat to the right. In this way, a light animation can be created, the light focal point of which moves in the direction of the animation direction AR. The same principle can be applied to the example in FIG. 6. In the case of FIG. 6, the light focal point is no longer an individual small region or point, but rather has an elongated extent. In the case of FIG. 6, the light focal point LW can be represented as a line of light. In FIG. 6, two opposite animation directions AR are shown. These opposing animation directions AR indicate that, starting from the upper or lower end of the OLED 14, the light intensity LS increases in the direction of a center of the OLED 14. The changes shown in FIGS. 5 and 6 with respect to the light focal point LW can be used specifically for the transmission of information to other road users. For example, an acceleration or a distance that is too small can be displayed. In this way, more dynamic light animations can be created that are more easily recognizable and attract more attention without causing additional glare, as is often the case with conventional lights. At the same time, specific visual effects can be created specifically for other road users. This can be done with the aid of a corresponding shift of the light focal point LW, as shown in FIGS. 5 and 6.

FIGS. 5 and 6 show a sensor 50 by way of example. This sensor 50 can in particular detect or measure a temperature of the OLED 14 or a temperature of each individual segment Si. This sensor 50 can also measure a running time of the OLED 14 or the light emission device 24. The running time describes in particular a number of operating hours of the light emission device 24 or a period of time that has passed since the production of the light emission device 24. With the aid of the measured temperatures of the respective segments Si or with the aid of an averaged temperature for the entire light emission device 24, any temperature effects of the light emission device 24 can be taken into account when controlling the respective segments Si. By measuring the running time, aging effects can also be taken into account when controlling the respective segments Si. The aging effects can relate, for example, to specific resistances in the feed lines to the respective segments Si. With the aid of these supply lines, the respective segments Si can be supplied with current or voltage. The control unit 40 can thus take into account temperature effects and aging effects by appropriately controlling the respective segments Si. In this way, material fatigue phenomena can be compensated for and a tail light 10 can be created, the service life of which can be increased. The temperature of the OLED 14 can take place, for example, with the aid of an NTC measurement. The speed of the light animations can also be adjusted with the aid of the control unit 40. Thus, a slow light animation as well as a faster light animation with higher dynamics can be implemented.

Figure 7:
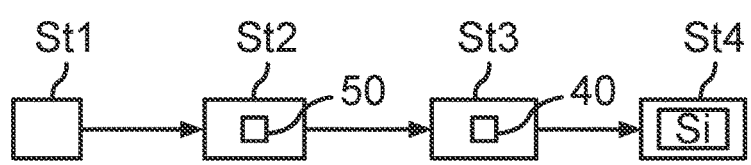
FIG. 7 shows a method for the tail light by way of example.

A possible method for controlling the respective segments Si is shown by way of example in FIG. 7. In the first step ST1, the necessary components for this method are provided. This primarily relates to the control unit 40 and the light emission device 24 with the associated segments Si. In a second step ST2, for example, the temperature and/or the running time of the OLED 14 or the light emission device 24 can be measured by means of the sensor 50. This information or values are transmitted to the control unit 40. In a third step ST3, the control unit 40 creates corresponding control signals for the respective segments Si. To this end, the control unit 40 can determine corresponding control functions 30. With the aid of these control functions 30, the respective segments Si can be controlled in a fourth step St4 in such a way that their corresponding luminance LD is changed in such a way that the corresponding light animation emerges therefrom. In this case, the control unit 40 takes into account that the photometric parameter of the tail light as the light emission device 10, averaged over all segments Si for the light animation, lies within the predefined interval.

As indicated by way of example in FIGS. 5 and 6, the control unit 40 controls different segments Si. In these two figures, two dashed arrows each run from the control unit 40 to a corresponding segment Si of the OLED 14. This indicates by way of example that the control unit 40 can control each of the individual segments Si of the OLED 14. Merely for the sake of clarity, only two dashed arrows have been drawn in.

Overall, the present invention shows that light animations can be carried out with the aid of segmented OLEDs 14. Other surface light sources having comparable technical properties to OLED technology can also be used. The respective segments Si of the OLED 14 are set in their luminance LD with the aid of the impressed current flow. The control unit 40 can thus control each of the individual segments Si individually and thus provide a separate luminance LD for each individual segment Si. The respective set luminances LD are preferably changed over time. This allows new dynamic light animations to be created, which can be used specifically for visual effects. For example, by shifting the light focal point LW, specific traffic-related information can be communicated to other road users. An information transmission of this type is particularly relevant in the field of fully autonomous motor vehicles 18.

The invention claimed is:

1. A lighting device for a motor vehicle for creating a light animation, comprising:
- a light emission device for creating the light animation, the light emission device being subdivided into a plurality of segments; and
- a control unit which is configured to:
  - separately control each of the plurality of segments of the light emission device;
  - control the plurality of segments differently at a plurality of points in time with respect to a photometric parameter relating to each of the plurality of segments in order to create and/or output the light animation;
  - apply a different current or voltage to each segment of the plurality of segments such that an average of the photometric parameter of the lighting device across the plurality of segments for the light animation is within a predefined interval;
  - determine a subset of the plurality of segments that forms a closed curve;
  - keep constant a first corresponding luminance of the subset of the plurality of segments that are assigned to the closed curve;
  - vary a second corresponding luminance of another subset of the plurality of segments that are assigned to an inner region of the closed curve for the light animation; and
  - use a control function to control each of the plurality of segments, wherein the control function describes a luminance of each of the plurality of segments at points in time and the predefined interval of the average photometric parameter wherein the predefined interval has a lower limit and an upper limit, and wherein the control function is a random function created using a random generator.

2. The lighting device of claim 1, further comprising a cover plate that is configured as a shielding element for partially shielding the light emission device from its surroundings.

3. The lighting device of claim 1, wherein the light emission device has an OLED with a plurality of segments, or the light emission device has a plurality of LED elements that serve as the plurality of segments with an optical element.

4. The lighting device of claim 1, wherein the control function is determined by the control unit so that a light focal point is shifted when creating the light animation.

5. The lighting device of claim 1, wherein the control unit is configured to change the photometric parameter of each of the plurality of segments by changing a corresponding current flow and/or changing a corresponding voltage applied to each of the plurality of segments, the changing using pulse-width modulation (PWM) dimming of at least a portion of the plurality of segments.

6. The lighting device of claim 1, further comprising a sensor configured to measure a temperature or a running time of the light emission device, wherein the control unit is further configured to additionally control and/or regulate the respective segments of the light emission device depending on the measured temperature of the light emission device and/or the running time of the light emission device.

7. A motor vehicle, comprising;
- a lighting device which further comprises: a light emission device for creating the light animation, the light emission device being subdivided into a plurality of segments; and
- a control unit which is configured to:
  - separately control each of the plurality of segments of the light emission device;
  - control the plurality of segments differently at a plurality of points in time with respect to a photometric parameter relating to each of the plurality of segments in order to create and/or output the light animation;
  - apply a different current or voltage to each segment of the plurality of segments such that an average of the photometric parameter of the lighting device across the plurality of segments for the light animation is within a predefined interval;
  - determine a subset of the plurality of segments that forms a closed curve;
  - keep constant a first corresponding luminance of the subset of the plurality of segments that are assigned to the closed curve;
  - vary a second corresponding luminance of another subset of the plurality of segments that are assigned to an inner region of the closed curve for the light animation; and
  - use a control function to control each of the plurality of segments, wherein the control function describes a luminance of each of the plurality of segments at points in time and the predefined interval of the average photometric parameter wherein the predefined interval has a lower limit and an upper limit, and wherein the control function is a random function created using a random generator.

8. A method for creating a light animation of a lighting device for a motor vehicle, the lighting device having a light emission device subdivided into a plurality of segments, the method comprising:
- separately controlling each of the plurality of segments of the light emission device;
- controlling the plurality of segments differently at a plurality of points in time with respect to a photometric parameter relating to each of the plurality of segments in order to create and/or output the light animation;
- applying a different current or voltage to each segment of the plurality of segments such that an average of the photometric parameter of the lighting device across the plurality of segments for the light animation is within a predefined interval, wherein the photometric parameter is a light intensity;
- determining a subset of the plurality of segments that forms a closed curve;
- keeping constant a first corresponding luminance of the subset of the plurality of segments that are assigned to the closed curve;

varying a second corresponding luminance of another subset of the plurality of segments that are assigned to an inner region of the closed curve for the light animation; and using a control function to control each of the plurality of segments, wherein the control function describes a luminance of each of the plurality of segments at points in time and the predefined interval of the average photometric parameter wherein the predefined interval has a lower limit and an upper limit, and wherein the control function is a random function created using a random generator.

9. The lighting device of claim 1, wherein the control device is further configured to deactivate a segment of the plurality of segments to generate a light intensity lower than a maximum light intensity for the segment.

10. The lighting device of claim 1, wherein the control device is further configured to dynamically assign the plurality of segments to different groups.

* * * * *